United States Patent [19]

Fujii et al.

[11] Patent Number: 5,026,778

[45] Date of Patent: Jun. 25, 1991

[54] POLYPROPYLENE-BASED RESIN COMPOSITION AND PROCESS FOR PREPARATION OF SHEETS COMPRISING THE RESIN COMPOSITION

[75] Inventors: Atsushi Fujii; Kazuyuki Fukuda, both of Himeji, Japan

[73] Assignee: Idemitsu Petrochemical Co., Ltd., Tokyo, Japan

[21] Appl. No.: 519,319

[22] Filed: May 4, 1990

Related U.S. Application Data

[63] Continuation-in-part of Ser. No. 354,341, May 19, 1989, abandoned.

[30] Foreign Application Priority Data

May 26, 1988 [JP] Japan .................................. 63-127139

[51] Int. Cl.$^5$ ...................... C08L 23/10; C08L 23/16; C08L 45/00; C08J 5/18
[52] U.S. Cl. .................................. 525/210; 525/240; 264/176.1; 264/210.6; 524/528; 524/387
[58] Field of Search .............................. 525/210, 240; 264/176.1, 210.6

[56] References Cited

U.S. PATENT DOCUMENTS

| | | | |
|---|---|---|---|
| 3,278,646 | 10/1966 | Lambert | 524/342 |
| 3,361,849 | 1/1968 | Cramer et al. | 525/210 |
| 3,663,488 | 5/1972 | Kail | 524/528 |
| 4,629,639 | 12/1986 | Lucas | 525/222 |

FOREIGN PATENT DOCUMENTS

| | | |
|---|---|---|
| 47-22449 | 10/1972 | Japan . |
| 72744 | 6/1977 | Japan . |
| 53-15894 | 5/1978 | Japan . |
| 53-117069 | 10/1978 | Japan . |
| 55-27203 | 2/1980 | Japan . |
| 157839 | 9/1983 | Japan . |
| 0163949 | 8/1985 | Japan . |
| 1020012 | 10/1961 | United Kingdom . |

Primary Examiner—Carman J. Seccuro
Attorney, Agent, or Firm—Frishauf, Holtz, Goodman & Woodward

[57] ABSTRACT

A polypropylene-based resin composition consisting essentially of 60–98% by weight of a polypropylene-based resin selected from the group consisting of (i) homopolypropylene, (ii) a crystalline random copolypropylene and (iii) a mixture of homopolypropylene and a crystalline random copolypropylene, 1–30% by weight of a petroleum resin, and 1–20% by weight of a low-crystalline or amorphous ethylene-α-olefin copolymer having a refractive index of from 1.480 to 1.505 at 25° C., and when said polypropylene-based resin is a crystalline random copolypropylene or a mixture of a homopolypropylene and a crystalline random copolypropylene, said ethylene-α-olefin is an amorphous copolymer.

23 Claims, 1 Drawing Sheet

POLYPROPYLENE-BASED RESIN COMPOSITION AND PROCESS FOR PREPARATION OF SHEETS COMPRISING THE RESIN COMPOSITION

This application is a continuation-in-part, of application Ser. No. 07/354,341, filed May 19, 1989, now abandoned.

BACKGROUND OF THE INVENTION (a) Field of the Invention

The present invention relates to a polypropylene-based resin composition which can be suitably used as resin material for production of polypropylene-based resin sheets, the polypropylene-based resin sheets being usable, as molding material, to production of various packaging containers or the like.

The present invention also relates to a method for preparation of polypropylene-based resin sheets by using the above-described polypropylene-based resin composition.

(b) Description of the Related Art

As polypropylene-based resins have excellent strength, rigidity, and heat resistance, they are used for packaging foods, chemicals, etc. by thermoforming sheets thereof to form containers.

However, polypropylene has a poor transparency, and there have been proposed many methods of improving the transparency of polypropylene by, for example, quenching an extruded resin sheet, by adding nucleating agents, or by adding a petroleum resin. Among them, the method of adding a petroleum resin can provide sheets excelling in transparency and moldability, but it has still left many problems such as insufficient low temperature impact strength of the produced sheets and drawdown caused by the indirect heating during thermoforming.

For example, in the method disclosed in Japanese Patent Application Publication No. 53-15894, polypropylene-based sheets are prepared by melting a composition comprising a polypropylene and an aliphatic or alicyclic petroleum resin at a temperature higher than the melting point of the polypropylene by 40° C. or more, followed by molding the molten composition by quenching it to a temperature of not higher than 60° C. by means of a chill roll method, an under-water method, etc. However, the obtained polypropylene-based sheets still have an insufficient transparency and a poor low temperature impact resistance, and furthermore a drawdown occurs during thermoforming the sheets.

The other methods disclosed in Japanese Patent Application Laid-open Nos. 53-117069 and 55-27203 attempt the improvement of the transparency of polypropylene-based sheets by adding a petroleum resin to a polypropylene-based resin and rolling the obtained sheets. However, the methods cannot attain sufficient improvement of transparency without a rolling of a high extent which causes decreases of the moldability and the low-temperature impact resistance of the sheets due to the orientation caused therein.

There has been a method for improving the low temperature impact resistance of a polypropylene-based resin by adding a low-crystalline or amorphous resin, such as an EPR, an ethylene-butene-1 copolymer, an SBR, and the like, to a polypropylene-based resin. The addition of such resins, however, results in a decrease in transparency or rigidity of the obtained resin sheets. In addition, there is also known a method for improving the thermoforming moldability of a polypropylene-based resin by adding an LDPE or an HDPE to a polypropylene-based resin. But this method also results in a decrease in transparency or rigidity of the obtained resin sheets.

SUMMARY OF THE INVENTION

The present invention is completed in view of the situation described above.

An object of the present invention is to provide methods for the preparation of polypropylene-based resin sheets which are superior in properties including transparency, rigidity, low temperature impact resistance, etc., and also in forming reproducibility in thermoforming, have a good extensibility as well as a good thickness distribution, and are advantageous in that a temperature region that can be used for molding is wide and a drawdown hardly occurs.

Another object of the present invention is to provide a polypropylene-based resin composition which can be suitably used for the preparation of the sheets in the methods of the present invention.

As the result of our researches to solve the above-described problems, we have found that the objects described above can satisfactorily be attained by a method of preparing a polypropylene-based resin sheet characterized by melting a composition obtained by adding a petroleum resin and a specific ethylene-α-olefin copolymer each in a specific amount to a polypropylene-based resin, and extruding the molten composition followed by quenching to obtain a sheet. On the basis of the above findings, we have eventually completed the present invention.

That is, the present invention provides a polypropylene-based resin composition comprising 60-98% by weight of a polypropylene-based resin selected from the group consisting of (i) homopolypropylene, (ii) a crystalline random copolypropylene and (iii) a mixture of homopolypropylene and a crystalline random copolypropylene 1-30% by weight of a petroleum resin, and 1-20% by weight of a low-crystalline or amorphous ethylene-α-olefin copolymer having a refractive index of from 1.480 to 1.505 at 25° C., and when said polypropylene-based resin is a crystalline random copolypropylene or a mixture of a homopolypropylene and a crystalline random copolypropylene, said ethylene-α-olefin is an amorphous copolymer.

The present invention further provides a method for preparation of a polypropylene-based resin sheet, which method comprises;

melting a resin composition comprising 60-98% by weight of a polypropylene-based resin selected from the group consisting of (i) homopolypropylene, (ii) a crystalline random copolypropylene and (iii) a mixture of homopolypropylene and a crystalline random copolypropylene, 1-30% by weight of a petroleum resin, and 1-20% of a low-crystalline or amorphous ethylene-α-olefin copolymer having a refractive index of from 1.480 to 1.505 at 25° C., and when said polypropylene-based resin is a crystalline random copolypropylene or a mixture of a homopolypropylene and a crystalline random copolypropylene, said ethylene-α-olefin is an amorphous copolymer, at a temperature of not lower than 200° C.;

extruding the molten resin composition to form a sheet; and quenching the extruded sheet to a temperature of not higher than 60° C.

DESCRIPTION OF THE PREFERRED EMBODIMENTS

Figure 1:
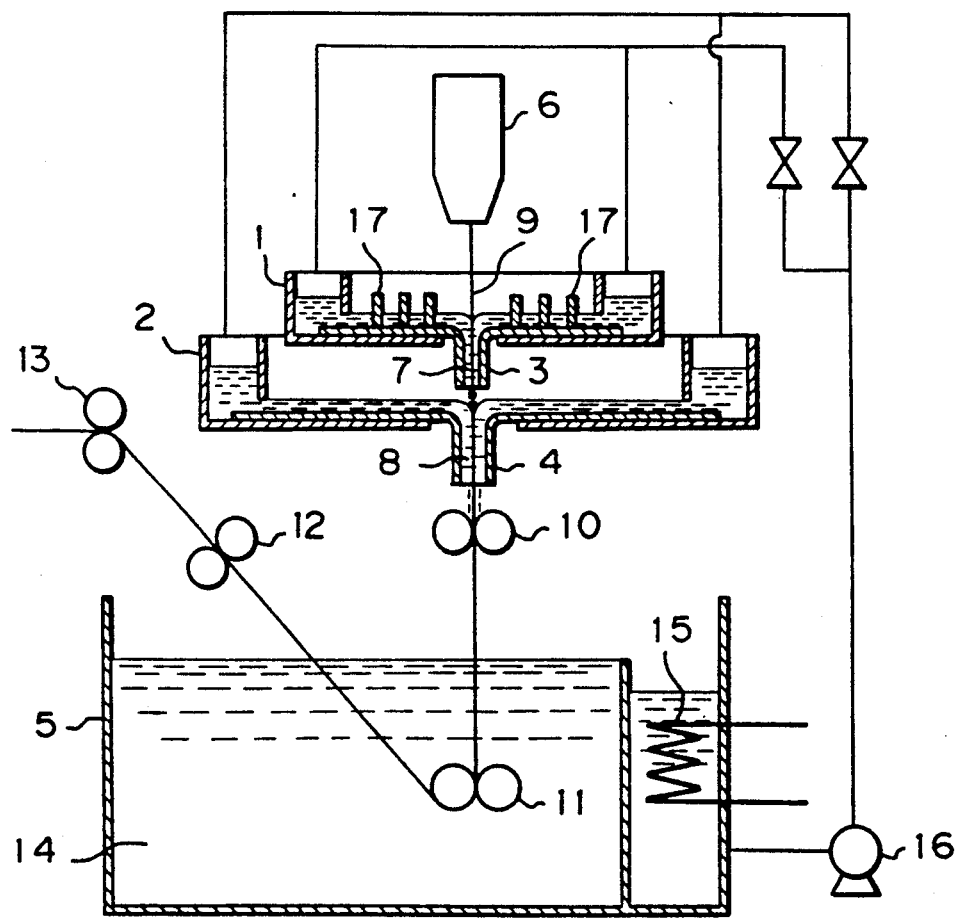
FIG. 1 is a sectional view conceptually showing an example of cooling device which may be used in the method according to the present invention.

The polypropylene-based resin to be used in the present invention may be a homopolypropylene (which is preferred), a crystalline random copolypropylene or a mixture of a homopolypropylene and a crystalline random copolypropylene. The homopolypropylene that is preferably suitably used in the present invention is a crystalline polypropylene. The examples of crystalline random copolypropylene which may be used in the present invention include crystalline random copolymers of propylene with one or more α-olefins other than propylene which contain the α-olefins in an amount of not more than 20% by weight, preferably not more than 15% by weight. The preferred α-olefins other than propylene include those having a carbon number of 2 or from 4 to about 10. These α-olefins may be of linear type or of branching type. Some illustrative examples of the α-olefins include ethylene, 1-butene, isobutene, 1-pentene, 3-methyl-1-butene, 1-hexene, 4-methyl-1-pentene, neohexene, 1-heptene, 1-octene, 1-decene, and the like. Among them, the especially preferred are ethylene, 1-butene, and the like.

The above crystalline random copolypropylene may be a copolymer of propylene and one of the α-olefins as described above or a copolymer of propylene and two or more of the α-olefins as described above or may be a mixture thereof.

The polypropylene-based resins that may be preferably used in the present invention are those having a melt index (MI) of usually 0.5–20 g/10 min., preferably 1–5 g/10 min.

The petroleum resins to be used in the present invention are not limited to specified ones. The preferred are aliphatic petroleum resins, alicyclic petroleum resins or hydrogenated terpene-based petroleum resins, or mixtures of two or more resins selected therefrom.

The aliphatic, alicyclic or hydrogenated terpene-based petroleum resins or the mixtures thereof that may be used in the present invention include known ones. The aliphatic, alicyclic or hydrogenated terpene-based petroleum resins or the mixtures thereof that may be suitably used in the present invention are usually those having a molecular weight of 400–5000, a softening point of 50°–160° C., and a hydrogenation-degree of not less than 80%. Some illustrative examples of the aliphatic petroleum resins include those prepared by hydrogenating hydrocarbon resins having a polymerization degree of about 5–20 which are produced by polymerizing olefin- and diene-hydrocarbon obtained by cracking a petroleum at high temperatures. Some illustrative examples of the alicyclic petroleum resins are those prepared by hydrogenating aromatic petroleum resins which are produced by polymerizing monomers; e.g., vinyltoluenes, vinylxylenes, propenylbenzenes, styrene, α-methylstyrene, indene, methylindenes, ethylindenes, etc. Some illustrative examples of the hydrogenated terpene-based petroleum resins are homopolymers or copolymers prepared by polymerizing terpene or turpentine monomers thereof and the products obtained by hydrogenating the monomers. Some examples of the monomers include acyclic, monocyclic or bicyclic monoterpenes, those containing other terpenes, terpene cuts or fractions, turpentines, turpentine cuts or fractions. Typical examples of the monomers or their components include allo-ocimene, carene, pinene, and the isomers thereof, dipentyneterpinenes, terpinolenes, limonenes, and the like. Among the hydrogenated terpene-based petroleum resins prepared by hydrogenation, the preferred are those having a hydrogenation degree of not less than 80%, more preferably not less than 90%, although it is possible to use those in which unsaturated bonds and/or aromatic rings partially remain.

The above petroleum resins may be used individually or in a combination of two or more of them.

In addition, as occasion demands, a nucleating agent or other additives may be added into the polypropylene-based resin composition within limits not prejudicial to the objects of the present invention, preferably in an amount of 0.05 to 0.5% by weight of the polypropylene-based resin composition. Known nucleating agents may be used in the present invention. Some illustrative examples are silica, talc, sodium benzoate, aluminum salt of p-tert-butylbenzoic acid, sodium salt of p-tert-butylphosphoric acid, polyvinylcycloalkanes, derivatives of dibenzylidenesorbitol, sodium methylenebisacidphosphate, and the like.

The above compounds may be used individually or in a combination of two or more of them.

The examples of the ethylene-α-olefin copolymers to be used in the present invention include low-crystalline or amorphous resins which are obtained by copolymerizing ethylene with one or more α-olefins, such as propylene, 1-butene, 1-pentene, 3-methyl-1-butene, 4-methyl-1-pentene, and the like. Among these resins, the preferred are those having a density of 0.85 to 0.91 g/cm$^3$ inclusive, preferably 0.86 to 0.90 g/cm$^3$ inclusive. The low-crystalline or amorphous ethylene-α-olefin copolymers have a refractive index of from 1.480 to 1.505 at 25° C. (preferably 1.485 to 1.500) to provide improved transparency characteristics (lower haze values) to the compositions of the present invention.

The ratios of the amounts of the respective, above components blended together in the present invention are 98 to 60% by weight, preferably 96 to 75% by weight of the polypropylene-based resin component, 1 to 30% by weight, preferably 2 to 20% by weight of the petroleum resin component, and 1 to 20% by weight, preferably 2 to 10% by weight of the ethylene-α-olefin copolymer component on the basis that the sum of the amounts of the polypropylene-based resin component, the petroleum resin component, and the ethylene-α-olefin copolymer component used is defined as 100% by weight.

If the amount of the petroleum resin component used is less than 2% by weight, there will be no effect on lowering and extending the molding temperature range of the obtained sheets, and furthermore both the transparency and rigidity of the obtained sheets will become insufficient. On the other hand, if it is in excess of 20% by weight, the impact resistance of the obtained sheets will become low, and bleeding or elution will occur, resulting in the deterioration of the properties of the polypropylene-based resin.

If the amount of the ethylene-α-olefin copolymer component used is less than 1% by weight, there will be no effect on the prevention of the drawdown and on the improvement of the impact resistance of the sheets. On the other hand, if it is in excess of 20% of by weight, the transparency of the obtained sheets will become low.

In the method for the preparation of polypropylene-based resin sheets according to the present invention, polypropylene-based resin sheets are prepared by melting the polypropylene-based resin composition of the present invention at a temperature of not lower than 200° C., extruding the molten resin composition to form a sheet, and then quenching the extruded sheet to a temperature of not higher than 60° C.

When melting the polypropylene-based resin composition, the order of addition of the respective, above components to be blended by melt kneading is not limited to a specified one, and these components may be added separately or may be mixed at a time.

It is possible to perform this melt kneading previously and separately by using a conventional melt kneading machine, but it is usually suitable to perform it by using a melt extruding apparatus having a melt kneading device. In all cases, after the melt kneading was performed, the resulting, molten polypropylene-based resin composition is extruded through the die of a melt extruding apparatus to form a sheet.

Further, besides the above polypropylene-based resin component, the above petroleum resin component, the above ethylene-α-olefin copolymer component, and the above necleating agent component, other conventional additives, e.g., stabilizers such as thermal stabilizers, ultraviolet absorbers, antioxidants, etc., and various surfacetants such as antifogging agents and antistatic agents, etc., may be added to the above described polypropylene-based resin compositions, as occasion demands.

The above melt kneading by using a melt extruding apparatus or the like is conducted, while maintaining the temperature of the resin composition at not less than 200° C., preferably in the rage of 220° to 300° C. inclusive. If the temperature for the melt kneading is less than 200° C., an unmolten matter will remain and the kneading will be performed only insufficiently, and furthermore a high extrusion power will be required. On the other hand, if it is too high, the decomposition of the petroleum resins will occur and, moreover, the efficiency of cooling will be decreased.

The melt extrusion may be usually performed by a T-die method with the temperature for melting (kneading) the resin composition maintained in the temperature range described above, while it is preferable that the temperature of the exit of the die be a little higher than that of the above molten resin composition. For instance, it is desirable to perform the melt extruding, while the temperature of the exit of the die being usually maintained at a temperature higher than that of the molten resin composition by about 10° to 60° C. inclusive. By keeping, thus, the temperature of the exit of the die at a temperature of a little higher than that of the molten resin composition, it is possible to keep the state of the surface of the extruded sheet extremely good. Then by quenching this sheet to a temperature of not higher than 60° C., it is possible to make the transparency of the sheet good. The lower this temperature, the better the transparency. It is preferable to perform the quenching by bringing the sheet into contact with cooling water having a temperature of not higher than 20° C. It is preferable to conduct the cooling by a slit-water cooling technique by using cooling water having a temperature of not higher than 10° C.

The cooling water which may be used in the present invention may be water only, or an aqueous solution obtained by adding an organic or inorganic thickener. Among them, the preferred are thickener added aqueous solutions in terms of uniformity of cooling and a smoothness of the surface of the obtained sheet.

The organic thickeners that may be used in the present invention include various ones; i.e., those of natural high molecular materials, semi-synthetic ones, synthetic ones, etc. Some examples of the natural high molecular materials include starches, such as sweet potato starch, potato starch, wheat starch, and the like; mannans, such as that of a konnjaku (a devil's-tongue) and the like; products of sea plants, such as agar, sodium alginate, and the like; mucilages of plants, such as tragacanth gum, gum arabic, and the like; mucilages of microorganisms, such as dextran, levan, and the like; proteins, such as glue, gelatin, casein, collagen, and the like; and etc. Some examples of the semi-synthetic, organic thickeners include derivatives of cellulose, such as viscose, methyl cellulose, carboxymethyl cellulose, and the like; derivatives of starch, such as soluble starch, carboxymethyl starch, dialdehyde starch, and the like; and etc.. Some examples of the synthetic, organic thickeners include polyvinyl alcohol, poly(sodium acrylate). polyethylene oxide, and the like.

The inorganic thickeners include silica sol, alumina sol, clay, water glass, varieties of metal salts, and the like. In the place of the aqueous solutions prepared by adding these thickeners to water, viscous materials such as polyethylene glycol, polypropylene glycol, silicone oil, etc. may be used as a coolant in the present invention.

It is suitable that the viscosity of the thickener added aqueous solution usually be from 2 to 3000 centipoise (cp), preferably from 3 to 1000 cp.

Cooling devices that may be suitably used in the present invention are, for example, those that are disclosed in Japanese Patent Application Laid-open No. 60-236719, that shown in FIG. 1 in Japanese Patent Application Laid-open No. 61-130018, or a cooling device (a cooling water flowing down type, water level controlled cooling device) to be shown hereinbelow in FIG. 1.

Some examples of the quenching procedure by using the above-described water cooling method used in the present invention are described as follows in more detail with reference to FIG. 1 shown below.

FIG. 1 is a sectional view conceptually showing an example of cooling devices which may be used in the present invention. In FIG. 1, the numerals 1 and 2 each represent a cooling water flowing down and introducing type water holder; the numerals 3 and 4 each represent a cooling water flowing down slit; and the numeral 5 represents a cooling water bath. Leading rolls 10–13 lead a resin composition sheet 9 extruded in a molten state from an extrusion T-die 6, in the direction in which the cooling water 7 and 8 is flowing down, whereby quenching the sheet 9, and then successively introduce the sheet into the cooling water bath 5. After the cooling is completed, the resin composition sheet 9 is recovered. The temperature of the cooling water in the cooling water bath 5 is controlled by using a temperature controlling mechanism 15 according to circumstances. The cooling water in the cooling water bath may be recycled to the cooling water flowing down type water holders 1 and 2 by using a pump 16, at need.

It is preferable to use cooling water flowing type slits in a manner of two stages as illustrated in FIG. 1. It is also preferred to use porous straighteners 17 in the watercourses of the water holders as shown in FIG. 1. Furthermore, it is especially preferred to control the rate of flowingdown of the cooling water within such a range that it is higher than the rate of introduction of the extruded sheet, while the holdup of the cooling water just before the internees of the slit being avoided. To avoid this holdup, it is suitable that the level of the water in the water holder is as low as possible, preferably not higher than 7 mm.

There are no special restrictions on the shape of the polypropylene-based resin composition sheets obtained in the present invention. They may be obtained as moldings, such as single layer sheets, multi-layer sheets, etc., having an intended size (width and thickness). It is suitable that the thickness of the resin composition sheets is in the range of usually about 100 to 3000 $\mu$m, preferably about 150 to 2000 $\mu$m, in respects of their transparency, strength, etc. The methods of the present invention is effective in the points that a high transparency can be maintained even for the sheets having a thickness of not less than 300 $\mu$m, especially, and so forth. According to the methods of the present invention, it is possible to make not only the transparency but also the surface states, such as glossiness, appearance, and the like, of the obtained resin composition sheets significantly good. To ensure favorable glossiness and appearance, it is desirable to keep the temperature of the exit of the extrusion die at a temperature of a little higher than that of the molten resin composition during the melt extrusion as described above and, in addition, to use an appropriate die without a flaw, and the like.

For the purpose of further improvements in transparency and rigidity, it is allowable to give a heat-treatment to the resin sheets prepared in the manners as described above.

The heat-treatment which may be optionally given may be performed by heating the above sheets in a temperature range of preferably 80° to 160° C., more preferably 100° to 150° C., for preferably 1 to 60 sec, more preferably 2 to 30 sec by using, for example, heating rollers, heating air, inert liquids, etc. It may be preferably conducted by a continuous treatment by using rollers.

In addition, the thermoforming moldabilities, such as the effectiveness of the prevention of the drawdown, of the resin composition sheets can be improved by conducting a drawing in the above heat-treatment, or before or after that. The drawing properties of the sheets are good because of the addition of the petroleum resin.

This drawing may be performed by a roll drawing method at a temperature of usually 80° to 160° C., preferably at a temperature lower than that of the melting point of the sheet by 5° to 70° C., more preferably at a temperature lower than that of the melting point by 5° to 50° C. The drawing can be conducted by uniaxial orientation or biaxial orientation. It may be preferably conducted in the temperature range of 120° to 150° C. simultaneously with the continuous heat-treatment by rollers to such an extent that the rate of width reduction is to be in a range of about 5 to 20%. Even if the drawing is done to a greater extent than that described above, there will be no extra effect and, on the contrary, at least a molding reproducibility in the thermoforming by drawing will decrease.

According to the manners as described above, the intended polypropylene-based resin sheets can be obtained. The polypropylene-based resin sheets obtained according to the methods of the present invention are superior in the properties, such as strength, heat resistance, moisture permeation resistance, etc., that a polypropylene resin originally possesses, and moreover are superior in rigidity and have a very high transparency. In the case of molding these sheets by thermoforming, such as vacuum forming, pressure forming, etc., to form containers, containers having a good extensibility and uniform thickness can be prepared in a wide range of forming temperature with a superior forming reproducibility and very small and rare drawdown. Because they are advantageous polypropylene-based resin sheets as described above, they can be widely and suitably utilized for preparing a variety of packaging containers, etc. In addition, these sheets can be utilized not only as thermoforming materials for containers but also as materials for preparing cases by bending and furthermore as original plates for the preparation of oriented films because of their superior drawing properties.

Moreover, the composition of the present invention can be used for preparing films by injection molding, blow molding or extrusion and for preparing extended films, etc.

Hereinafter, the present invention is described in more details on the basis of Examples. However, the present invention is not limited to them.

EXAMPLES 1 TO 12 AND COMPARATIVE EXAMPLES 1 TO 6

By using a T-die extruding apparatus (extruder diameter 90 mm, L/D=24, die width 850 mm, die lip opening 2 mm), polypropylene-based resin compositions having the respective blend compositions shown in Table 1 were separately melt-kneaded under the conditions that the resin temperature is 240° C. and the die temperature 280° C., and extruded to form transparent sheets. Then, the extruded sheets were each independently introduced into a two-stage slit-type cooling device (As to the first-stage slit: 50 mm in height, 2.5 mm in width, 4 mm at water level, 5° C. at cooling water temperature, with porous straighteners in the flow way. As to the second-stege slit: 10 mm in height, 2.5 mm in width, 10 mm at water level, 4° C. at cooling water temperature.) and were quenched to 4° C. in 1 to 3 sec; and, as the result, sheets having a thickness of 0.3 mm were obtained. The resulting sheets were each independently given a heat treatment by using rollers having a diameter of 300 mm whose temperature is 130° C. The properties of the respective sheets measured are shown in Table 1. In the above heat treatment, some of the sheets were drawn.

The abbreviations or symbols used in the table represent the followings, respectively.

PP-1: IDEMITSU POLYPRO F-200S (a homopolypropylene, MI=2.0 g/10 min, produced by Idemitsu Petrochemical Co., Ltd.)

PP-2: 80% by weight of IDEMITSU POLYPRO F200S and IDEMITSU POLYPRO F744N (a propylene-ethylene random copolymer, ethylene content: 3.5% by weight, MI=7.0 g/10 min, produced by Idemitsu Petrochemical Co., Ltd.)

PR-1: ARCON P-140 (an alicyclic petroleum resin, molecular weight 1000, softening point 140° C., completely hydrogenated resin, produced by Arakawa Chemical Industries, Ltd.)

PR-2: KLEARON P-125 (a hydrogenated terpene resin, molecular weight 700, softening point 125° C., completely hydrogenated resin, produced by Yasuhara Yushi Kogyo Co., Ltd.)

EB-1: TAFMER A-4085 (an ethylene-1-butene copolymer, 1-butene content: 15.5% by weight, MI=4.0 g/10 min, density 0.88 g/cm³, produced by Mitsui Petrochemical Industries, Ltd.) Refractive index at 25° C. of 1.494.

EB-2: TAFMER P-0280 (an ethylene-propylene rubber, MI=3 g/10 min, density 0.88 g/cm³, produced by Mitsui Petrochemical Industries, Ltd.) Refractive index at 25° C. of 1.480.

nucleating agent: GEL ALL MD (1,3-, 2,4-dibenzylidenesorbitol, produced by New Japan Chemical Co., Ltd.)

EB-3: EP 11 (an ethylene-propylene rubber, propylene content: 50% by weight, density 0.868 g/cm³, Money viscosity (100° C.) 40, produced by Japan Synthetic Rubber.) Refractive index at 25° C. of 1.474.

In addition, the properties of the obtained sheets were measured according to the testing methods as follows.

Haze; JIS K-7105

Tensile modulus; JIS K-7113

Impact strength; Idemitsu method (at −5° C.) based on du Pont impact strength and JIS K 7211

Then, by using the respective, resulting sheets, containers having an opening diameter of 100 mm, a bottom diameter of 85 mm and a height of 40 mm were prepared by molding the sheets at a molding temperature of 160° C. The forming reproducibilities (showing ⊙: good, x: poor) of the containers in this case are shown in Table 1. In addition, the drawdown values for the sheets measured in the case that each of the sheets fixed in a frame of 500 mm ×5000 mm in size are also shown in Table 1.

TABLE 1

| | Resin compositions (wt %) | | | | Techniques | Properties of sheets | | |
|---|---|---|---|---|---|---|---|---|
| | PP*1 | PR*2 | EB*3 | Nucleating agent | for sheet preparation | Haze (%) | Tensile modulus MD/TD (kg/cm²) | Impact strength (kg · cm/cm) |
| Example 1 | PP-1 90 | PR-1 5 | EB-1 5 | — | Water cooling Heat treatment | 5 | 19000/18000 | 154 |
| Example 2 | PP-1 85 | PR-1 10 | EB-1 5 | — | Water cooling Heat treatment | 4 | 21000/20000 | 152 |
| Example 3 | PP-2 90 | PR-1 5 | EB-1 5 | — | Water cooling Heat treatment | 3 | 19000/17000 | 156 |
| Example 4 | PP-1 90 | PR-2 5 | EB-1 5 | — | Water cooling Heat treatment | 4 | 19000/18000 | 148 |
| Example 5 | PP-1 90 | PR-2 5 | EB-2 5 | — | Water cooling Heat treatment | 4 | 20000/19500 | 138 |
| Example 6 | PP-1 90 | PR-1 5 | EB-1 5 | — | Water cooling Heat treatment | 5 | 21000/18500 | 153 |
| Example 7 | PP-1 90 | PR-1 5 | EB-1 5 | — | Water cooling Heat treatment | 4 | 22000/21500 | 161 |
| Example 8 | PP-1 90 | PR-1 5 | EB-1 5 | — | Water cooling Heat treatment | 5 | 21000/20000 | 152 |
| Example 9 | PP-1 96 | PR-2 2 | EB-1 2 | — | Water cooling Heat treatment | 7 | 18000/18000 | 152 |
| Example 10 | PP-1 60 | PR-1 20 | EB-1 20 | — | Water cooling Heat treatment | 2 | 20000/20000 | 135 |
| Example 11 | PP-1 89.7 | PR-1 5 | EB-1 5 | 0.3 | Water cooling Heat treatment | 4 | 23000/23000 | 131 |
| Example 12 | PP-1 90 | PR-1 5 | EB-1 5 | — | Water cooling No heat treatment | 10 | 16000/16500 | 164 |
| Comparative example 1 | PP-1 95 | PR-2 5 | — | — | Water cooling Heat treatment | 3 | 22000/21000 | 120 |
| Comparative example 2 | PP-1 95 | — | EB-1 5 | — | Water cooling Heat treatment | 14 | 17500/16000 | 168 |
| Comparative example 3 | PP-1 60 | PR-1 35 | EB-1 5 | — | Water cooling Heat treatment | 3 | 22000/22000 | 24 |
| Comparative example 4 | PP-1 70 | PR-1 5 | EB-1 25 | — | Water cooling Heat treatment | 18 | 14000/15000 | 171 |
| Comparative example 5 | PP-1 90 | PR-2 5 | EB-1 5 | — | Air knife method Heat treatment | 21 | 18000/17000 | 142 |
| Comparative example 6 | PP-1 90 | PR-2 5 | EB-3 5 | — | Water cooling No heat treatment | 19 | 18000/15000 | 182 |

| | Thermoformabilities | | Width reduction rate by extension (%) |
|---|---|---|---|
| | Forming reproducibility | Drawdown (mm) | |
| Example 1 | ⊙ | 20 | |
| Example 2 | ⊙ | 30 | |
| Example 3 | ⊙ | 45 | |
| Example 4 | ⊙ | 25 | |
| Example 5 | ⊙ | 20 | |
| Example 6 | ⊙ | 5 | 130° C. 5% extension |
| Example 7 | ⊙ | 0 | 130° C. 12% extension |
| Example 8 | ⊙ | 10 | 110° C. 5% extension |
| Example 9 | ⊙ | 20 | |
| Example 10 | ⊙ | 40 | |

TABLE 1-continued

| | | |
|---|---|---|
| Example 11 | ⊚ | 45 |
| Example 12 | ⊚ | 20 |
| Comparative example 1 | ⊚ | 35 |
| Comparative example 2 | X | 20 |
| Comparative example 3 | ⊚ | 90< |
| Comparative example 4 | ⊚ | 20 |
| Comparative example 5 | ⊚ | 20 |
| Comparative example 6 | ⊚ | 15 |

PP*¹: polypropylene-based resin
PR*²: petroleum resin
EB*³: ethylene-α-olefin copolymer

What is claimed is:

1. A polypropylene-based resin composition consisting essentially of 60–97% by weight of a polypropylene-based resin selected from the group consisting of (i) homopolypropylene, (ii) a crystalline random copolypropylene and (iii) a mixture of homopolypropylene and a crystalline random copolypropylene, 2–20% by weight of a petroleum resin, and 1–20% by weight of a low-crystalline or amorphous ethylene-α-olefin copolymer having a refractive index of from 1.480 to 1.505 at 25° C., and when said polypropylene-based resin is a crystalline random copolypropylene or a mixture of a homopolypropylene and a crystalline random copolypropylene, said ethylene-α-olefin is an amorphous copolymer.

2. The polypropylene-based resin composition as claimed in claim 1, wherein the polypropylene-based resin is a homopolypropylene or a crystalline random copolypropylene obtained by copolymerizing propylene with ethylene or 1-butene, the random copolypropylene containing ethylene units or 1-butene units in an amount of not more than 15% by weight.

3. The polypropylene-based resin composition as claimed in claim 1, wherein the polypropylene-based resin has a melt index of 0.5 to 20 g/10 min.

4. The polypropylene-based resin composition as claimed in claim 1, wherein the petroleum resin is an alicyclic petroleum resin.

5. The polypropylene-based resin composition as claimed in claim 1, wherein the petroleum resin is a hydrogenated terpene resin.

6. The polypropylene-based resin composition as claimed in claim 1, wherein the petroleum resin has a molecular weight of 400 to 5000, a softening point of 50° to 160° C., and a hydrogenation-degree of not less than 80%.

7. The polypropylene-based resin composition as claimed in claim 1, wherein the ethylene-α-olefin copolymer is a copolymer obtained by copolymerizing ethylene with at least one α-olefin selected from the group consisting of propylene, 1-butene, 1-pentene, 3-methyl-1-butene, and 4-methyl-1-pentene.

8. The polypropylene-based resin composition as claimed in claim 1, wherein the ethylene-α-olefin copolymer is an ethylene-1-butene copolymer.

9. The polypropylene-based resin composition as claimed in claim 1, wherein the ethylene-α-olefin copolymer has a density of 0.85 to 0.91 g/cm³ inclusive.

10. The polypropylene-based resin composition as claimed in claim 1, wherein the ethylene-α-olefin copolymer has a density of 0.86 to 0.90 g/cm³ inclusive.

11. A polypropylene-based resin composition comprising (a) 100 parts by weight of a polypropylene-based resin composition consisting essentially of 60–97% by weight of a polypropylene-based resin selected from the group consisting of (i) homopolypropylene, (ii) a crystalline random copolypropylene and (iii) a mixture of homopolypropylene and a crystalline random copolypropylene, 2–20% by weight of a petroleum resin, and 1–20% by weight of a low-crystalline or amorphous ethylene-α-olefin copolymer having a refractive index of from 1.480 to 1.505 at 25° C. and (b) 0.05 to 0.5 parts by weight of a nucleating agent; and when said polypropylene-based resin is a crystalline random copolypropylene or a mixture of a homopolypropylene and a crystalline random copolypropylene, said ethylene-α-olefin is an amorphous copolymer.

12. The polypropylene-based resin composition as claimed in claim 11, wherein the nucleating agent is a derivative of dibenzylidenesorbitol.

13. A method for preparation of a polypropylene-based resin sheet, which method comprises;
melting a resin composition comprising 60–97% by weight of a polypropylene-based resin selected from the group consisting of (i) homopolypropylene, (ii) a crystalline random copolypropylene and (iii) a mixture of homopolypropylene and a crystalline random copolypropylene, 2–20% by weight of a petroleum resin, and 1–20% by weight of a low-crystalline or amorphous ethylene-α-olefin copolymer having a refractive index of from 1.480 to 1.505 at 25° C., and when said polypropylene-based resin is a crystalline random copolypropylene or a mixture of a homopolypropylene and a crystalline random copolypropylene, said ethylene-α-olefin is an amorphous copolymer, at a temperature of not lower than 200° C.; extruding the molten resin composition to form a sheet; and quenching the extruded sheet to a temperature of not higher than 60° C.

14. A method for preparation of a polypropylene-based resin sheet, which method comprises;
melting a resin composition comprising 60–97% by weight of a polypropylene-based resin selected from the group consisting of (i) homopolypropylene, (ii) a crystalline random copolypropylene and (iii) a mixture of homopolypropylene and a crystalline random copolypropylene, 2–20% by weight of a petroleum resin, and 1–20% by weight of a low-crystalline or amorphous ethylene-α-olefin copolymer having a refractive index of from 1.480 to 1.505 at 25° C., and when said polypropylene-based resin is a crystalline random copolypropylene or a mixture of a homopolypropylene and a crystalline random copolypropylene, said ethylene-α-olefin is an amorphous copolymer, at a temperature of not lower than 200° C.;

extruding the molten resin composition to form a sheet; quenching the extruded sheet to a temperature of not higher than 60° C.; and then heating the resulting sheet at a temperature of from 80° to 160° C.

15. A method for preparation of a polypropylene-based resin sheet, which method comprises;

melting a resin composition comprising 60–97% by weight of a polypropylene-based resin selected from the group consisting of (i) homopolypropylene, (ii) a crystalline random copolypropylene and (iii) a mixture of homopolypropylene and a crystalline random copolypropylene, 2–20% by weight of a petroleum resin, and 1–20% by weight of a low-crystalline or amorphous ethylene-α-olefin copolymer having a refractive index of from 1.480 to 1.505 at 25° C., and when said polypropylene-based resin is a crystalline random copolypropylene or a mixture of a homopolypropylene and a crystalline random copolypropylene, said ethylene-α-olefin is an amorphous copolymer, at a temperature of not lower than 200° C.;

extruding the molten resin composition to form a sheet; quenching the extruded sheet to a temperature of not higher than 60° C.; and then drawing the resulting sheet under heating at a temperature of from 80° to 160° C. to reduce the width of the sheet by 5 to 20%.

16. The method for preparation of a polypropylene-based resin sheet as claimed in claim 13, 14 or 15, wherein the quenching of the extruded sheet is performed by bringing the extruded sheet into contact with water of a temperature of not higher than 20° C.

17. The method for preparation of a polypropylene-based resin sheet as claimed in claim 13, 14 or 15, wherein the quenching of the extruded sheet is performed in a slit with cooling water flowing down through the slit.

18. The polypropylene-based resin composition as claimed in claim 1, wherein said ethylene-α-olefin copolymer has a refractive index of from 1.485 to 1.500 at 25° C.

19. The polypropylene-based resin composition as claimed in claim 11, wherein said ethylene-α-olefin copolymer has a refractive index of from 1.485 to 1.500 at 25° C.

20. The polypropylene-based resin composition as claimed in claim 1, wherein said polypropylene-based resin is a homopolypropylene.

21. The polypropylene-based resin composition as claimed in claim 1, wherein said polypropylene-based resin is a crystalline homopolypropylene.

22. The polypropylene-based resin composition as claimed in claim 11, wherein said polypropylene-based resin is a homopolypropylene.

23. The polypropylene-based resin composition as claimed in claim 11, wherein said polypropylene-based resin is a crystalline homopolypropylene.

* * * * *